H. C. PAYNE.
COMBINED LEMON JUICE EXTRACTOR AND EGG SEPARATOR.
APPLICATION FILED OCT. 18, 1911.
1,054,606.
Patented Feb. 25, 1913.
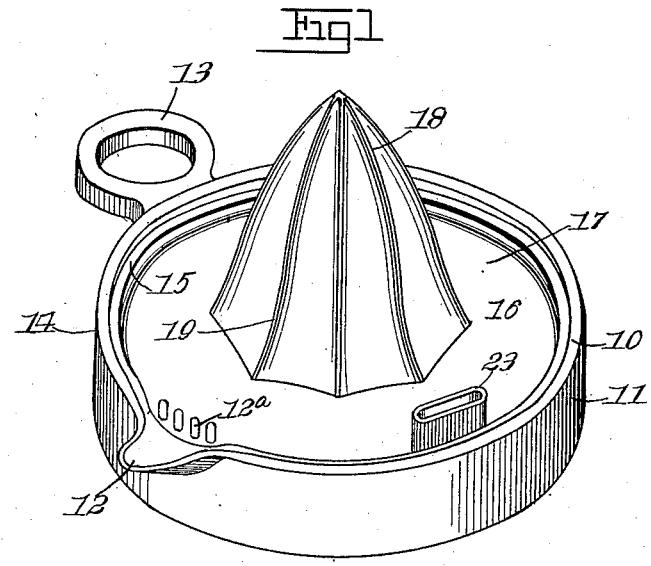
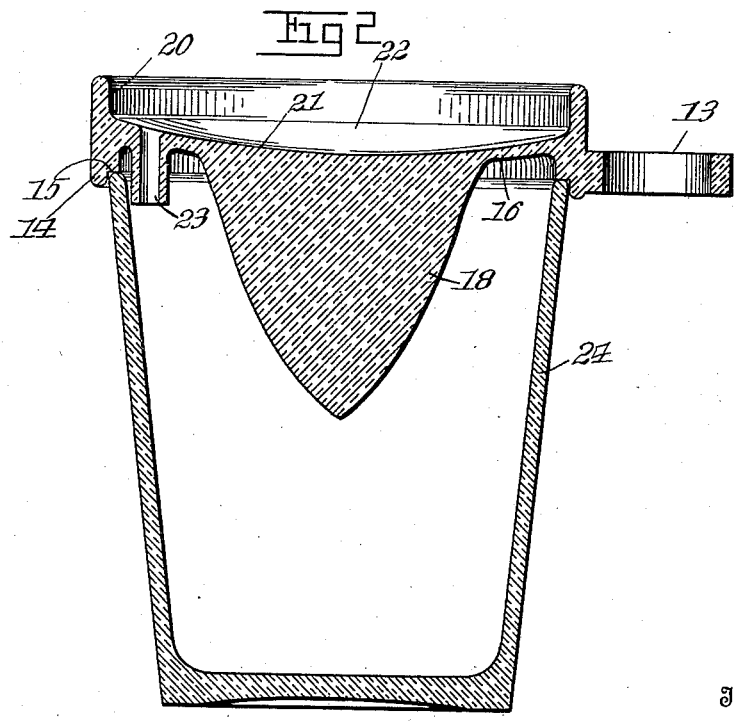
Witnesses
Inventor
Henry C. Payne
By Victor J. Evans
Attorney

UNITED STATES PATENT OFFICE.

HENRY C. PAYNE, OF ZION CITY, ILLINOIS, ASSIGNOR OF ONE-HALF TO GUSTAVUS W. KRAMM, OF AUGUSTA, MONTANA.

COMBINED LEMON-JUICE EXTRACTOR AND EGG-SEPARATOR.

1,054,606.     Specification of Letters Patent.     Patented Feb. 25, 1913.

Application filed October 18, 1911. Serial No. 655,288.

*To all whom it may concern:*

Be it known that I, HENRY C. PAYNE, a citizen of the United States, residing at Zion City, in the county of Lake and State of Illinois, have invented new and useful Improvements in Combined Lemon-Juice Extractors and Egg-Separators, of which the following is a specification.

An object of the invention is to provide a device for extracting the juice from lemons and the like and for separating the whites of eggs from the yolks thereof.

For the purpose mentioned, use is made of a dish-shaped body provided with means for the reception of a lemon or the like to extract the juice therefrom, the said dish-shaped body being adapted to receive the contents of an egg so that the whites thereof can be separated from the yolk of the egg.

Reference is to be had to the accompanying drawings constituting a part of this specification, in which similar characters of reference denote corresponding parts in all the views, and in which—

Figure 1 is a perspective view of my device, the same being in position to receive a lemon for extracting the juice therefrom. Fig. 2 is a vertical sectional view showing my device applied to a tumbler and adapted for separating the contents of an egg.

Referring more particularly to the views, I provide a dish-shaped body 10 provided with a base 11 and a pouring spout 12, a handle 13 being extended from the said base. The base 11 is provided with an upwardly extending circular flange 14 having a seat 15 and the said flange, together with the upper side 16 of the base 11 constitutes a circular basin 17 adapted to receive therein the juice from a lemon. Integrally formed on the upper side 16 of the base 11 and extending upwardly therefrom is a conically shaped head 18, the said head being spaced from the side wall or flange 14 and provided with integral fluted portions 19. The base 11 has a depending integral circular flange 20, which together with the under side 21 of the base 11 forms a basin 22, the said under side 21 being preferably curved as shown in Fig. 2. Integrally formed on the base and extending upwardly therefrom is a duct 23, the said duct being adapted to extend slightly above the flange 14 and being spaced from the said flange and the head 18 as shown in Figs. 1 and 2. For the purpose of preventing any lemon seeds from passing outwardly through the pouring spout 12 with the lemon juice, a series of upwardly extending lugs 12$^a$ are formed on the flange 14 immediately adjacent the inner end of the pouring spout 12.

In the use of my device, when the same is to be employed for extracting the juice from a lemon, the dish body 10 is positioned as shown in Fig. 1 and a lemon is mounted to encircle the head 18. Now by pressing inwardly upon the sides of the lemon and turning the lemon relatively to the head 18, the juice contained in the lemon will be extracted therefrom by the pressure exerted upon the lemon and the said juice will be received in the basin 17. The basin 17 can be filled with lemon juice without danger of any of the juice passing through the aperture in the duct 23 inasmuch as the said duct projects upwardly beyond the top of the flange 14 as has been heretofore mentioned. By grasping the handle 13 and tilting the body 10, the lemon juice in the basin 17 can be poured therefrom by permitting the same to flow outwardly between the lugs 12$^a$ and over the pouring spout 12.

When my device is to be used as an egg separator, the body 10 is moved into an inverted position and adapted to repose upon a tumbler 24 with the seat 15 engaging the upper edge of the tumbler 24 as shown in Fig. 2. The egg is then broken so that the contents thereof will be received in the basin 22 and by slightly tilting the tumbler 24 or body 10, the contents of the egg will move toward one side of the basin so that the whites of the egg will pass downwardly through the aperture in the duct 23, while the yolk being of a more solid nature and compactly held together, is prevented from passing through the duct 23 and will remain in the basin 22.

From the foregoing description, it will be readily seen that my device embodies a structure conveniently adapted for the purposes heretofore set forth and although for the purpose of describing my combined lemon juice extractor and egg separator, I have shown a particular construction thereof, the scope of the invention is not limited to the construction shown, but is defined in the appended claim.

Having thus fully described the invention, what I claim as new, is:—

As a new article of manufacture, a concave body having circular flanges projecting therefrom, one of the said flanges forming a seat and the other constituting a basin with the concave face of the body, and a duct projecting from a side of the body and communicating with the said basin.

In testimony whereof I affix my signature in presence of two witnesses.

HENRY C. PAYNE.

Witnesses:
BUDD R. COLE,
PETER LAWSON.

Copies of this patent may be obtained for five cents each, by addressing the "Commissioner of Patents, Washington, D. C."